United States Patent [19]
Michels et al.

[11] 3,934,860

[45] Jan. 27, 1976

[54] APPARATUS FOR THE TREATMENT OF MEAT PRODUCTS

[75] Inventors: Paul W. Michels, Plasmolen-Mook; Ben G. Langen, Oeffelt, both of Netherlands

[73] Assignee: Homburg B.V., Cuyk, Netherlands

[22] Filed: Apr. 13, 1973

[21] Appl. No.: 350,746

[30] Foreign Application Priority Data
Apr. 13, 1972 Netherlands............... 7204990

[52] U.S. Cl.................................. 259/108; 416/223
[51] Int. Cl.² .......................................... B01F 7/16
[58] Field of Search .......... 259/122, 121, 111, 108, 259/107, 106, 103, 102, 67, 66, 65, 64, 43, 259/42, 41, 40, 24, 23, 22, 21, 8, 7, 6, 5; 99/348

[56] References Cited
UNITED STATES PATENTS
2,657,912  11/1953  Liebman........................... 259/107
3,318,583  5/1967  Wright............................... 259/122
3,488,038  1/1970  Staaf.................................. 259/108

Primary Examiner—Harvey C. Hornsby
Assistant Examiner—Donald B. Massenberg
Attorney, Agent, or Firm—Browdy and Neimark

[57] ABSTRACT

A method for preparing non-perishable shaped meat products including ham products with fat and rind, involves subjecting chunks of meat, with or without fat or rind, to a stirring treatment which includes both horizontal and vertical components of movement. The meat is then molded, heated and packed. An apparatus for providing the stirring motion includes a container with a vertical shaft and non-perpendicular blades attached thereto.

2 Claims, 4 Drawing Figures

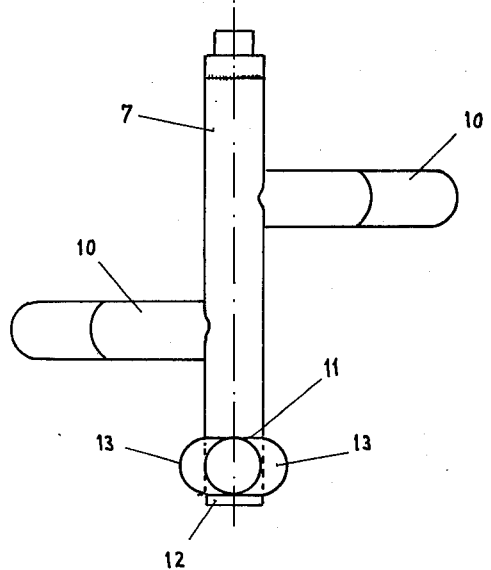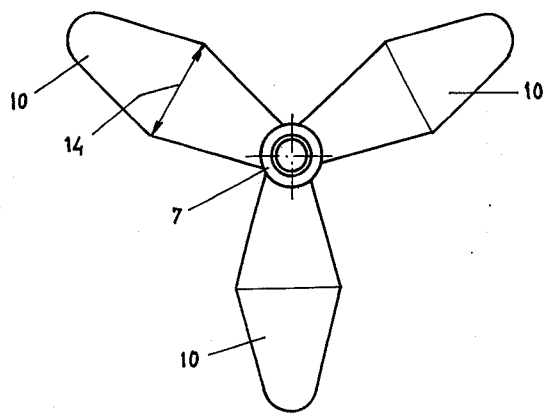

APPARATUS FOR THE TREATMENT OF MEAT PRODUCTS

CROSS-REFERENCE TO RELATED APPLICATION

The present application is an improvement over the apparatus disclosed in U.S. application Ser. No. 835,235 filed June 20, 1969, now U.S. Pat. No. 3,775,134 the entire contents of which are hereby incorporated by reference.

FIELD OF THE INVENTION

The present invention relates to a method and apparatus for treating meat for storage in a shaped form and, more particularly, to an improved method of stirring deboned and brine-injected meat products to obtain a high quality product.

BACKGROUND OF THE INVENTION

The U.S. patent application Ser. No. 835,235, now U.S. Pat. No. 3,775,134 describes a method for preparing cured shaped meat products wherein meat products such as hams or picnics, after deboning and injecting brine therein, are stored in a container wherein they are subjected to a stirring movement, whereafter the thus treated meat products are further finished, e.g. canned and heated.

This method constituted a great improvement relative to methods which were previously used, wherein the meat had had to be treated in a rigorously operating mixing apparatus or rotary churn, usually in vacuum. The method using a stirring operation not only permits an important simplification of the prior treating process, but, moreover, products of considerably better quality are obtained. This is the reason why the above-mentioned method has found wide acceptance in many contries within a very short time.

According to the U.S. Pat. application No. 3,775,134 the stirring operation may be carried out continuously or intermittently and according to the example described in that application the stirring takes place for 5 minutes per hour during 24 hours. In practice shorter durations of treatment may now and then suffice, e.g. about 18 hours. For carrying out the method an open container is used having stirring means therein which may be usually connected to the container. In all embodiments marketed up until now, this stirring means comprises a vertical shaft having secured to it in perpendicular relation one or more stirring blades, usually three or four, which are offset in angular position and in height with respect to each other. Of course a driving mechanism is connected for the stirring means and the assembly is usually provided with a time switch mechanism so that the stirring means is switched into operation at predetermined points of time and operates during a predetermined period of time. The stirring treatment is carried out at a moderate rate of speed, usually 20–30 revolutions per minute. This treatment does not substantially increase the temperature of the meat.

Notwithstanding the commercial success of this method using prior apparatus not all desired products can be manufactured thereby. Generally hams and picnics, which are canned or packed in some other way in molded form, are sold in three qualities, i.e. without fat and rind, with fat and without rind, and with fat and rind. The above discussed method can only be carried out with hams and picnics stripped of fat and rind by cutting these off and this means that only the most expensive quality of said products can be prepared by this method. For other qualities, up until now one had to go back to the older methods with churning or the like (U.S. Pat. No. 3,076,713) which are much more troublesome.

SUMMARY OF THE INVENTION

Surprisingly it has now been found that the processing of any meat product, including hams and picnics with fat or with fat and rind, is indeed possible according to the method of U.S. Pat. No. 3,775,134 using stirring, provided that special measures are applied which result in a somewhat longer and less intense treatment than was usual. This is particularly surprising since the method according to the U.S. Pat. No. 3,775,134 meant already a much less intense treatment than the treatments according to U.S. Pat. No. 3,076,713, so that especially for the processing of hams and picnics with fat and rind, no success could have been expected from a still less intense treatment. Moverover, it appears that the method according to the present invention leads in all cases, e.g. also with hams and picnics without fat and rind, to a product having a better structure than up until now was obtained with the stirring method using prior apparatus according to the U.S. Pat. No. 3,775,134.

The invention provides an apparatus for carrying out a method for the preparation of cured shaped meat products wherein meat products, which have been deboned (if necessary) and injected with brine, are stored in a container and are subjected therein to a stirring movement, whereafter the stirred meat products are molded, heated and packed (e.g. by canning), said method being characterized in that the stirring operation is carried out with the use of a stirring means which during the stirring imparts simultaneously a vertical component of movement to the meat products.

In accordance with a particular embodiment, pork hams and shoulders with fat or with both fat and rind are stirred in this way continuously during 24–48 hours with 1–5 revolutions per minute.

When processing other meat products, such as hams and picnics without fat and rind, the meat structure is retained much better than in the known method. Although in this specifically mentioned case the duration of the treatment is somewhat longer, this is more than compensated by the improvement of the quality.

Generally, any meat product may be processed which is desired to be obtained in molded form in some package, such as a tin, can or a plastic bag. Besides hams and pork shoulders the following meat products may be mentioned as non-limiting examples:

Beef; lamb; tongues and other offals; poultry, including chicken and turkey; loins of port; gammons and fore-ends (which should not be pickled with brine, but with phosphate solution); and roast pork (which should be pickled with dilute phosphate solution).

If the modern brine injector is used, the meat products should be deboned first. If the pickling is carried out by injection into a vein or artery, the deboning may take place thereafter.

The time and intensity of the stirring treatment will of course depend on the nature of the products to be processed. Using the stirring treatment which includes both a vertical and a horizontal component of movement, the processing is somewhat milder and processing times of 12–36 hours will suffice for most products, with actual stirring times of 5–16 minutes per hour, using stirring speeds up to 25 revolutions per minute (rpm). Generally, there will be a roughly inverse relation between time and intensity of the treatment.

In the special case of pork hams and shoulders with fat or with fat and rind, the preferred conditions are a total processing time of 30–36 hours, wherein the stirring is continuous with 2–3 rpm.

After the treatment according to the invention the meat products are heated and packed in some usual way. Thus, they may be canned and then heated, during which treatment the separate meat pieces integrate to a molded, e.g. loaf-shaped product. Alternatively one may also mold the meaat by compressing it in open molds from which, after heating, the molded products are removed, and then packed in plastic packages; if desired the product may be sliced before packing.

For carrying out the present method it is suitable to use a container of the general type marketed for carrying out the method according to the U.S. Pat. No. 3,775,134. However, in this case the blade or blades of the stirring device should have positions relative to the shaft such that they impart at the same time a vertically directed component of movement to the stirred material. To this end the blades have surfaces extending entirely or partially in a non-perpendicular relation to the shaft.

BRIEF DESCRIPTION OF THE DRAWING

For a better understanding of the invention possible embodiments thereof will now be described with reference to the attached drawing which shows examples of suitable embodiments of such an apparatus, it being understood that these embodiments are merely exemplary:

FIG. 3 is a side elevation of the stirring means according to a second preferred embodiment.

FIG. 4 is a plan view of the stirring means according to FIG. 3.

DESCRIPTION OF PREFERRED EMBODIMENTS

Figure 1:
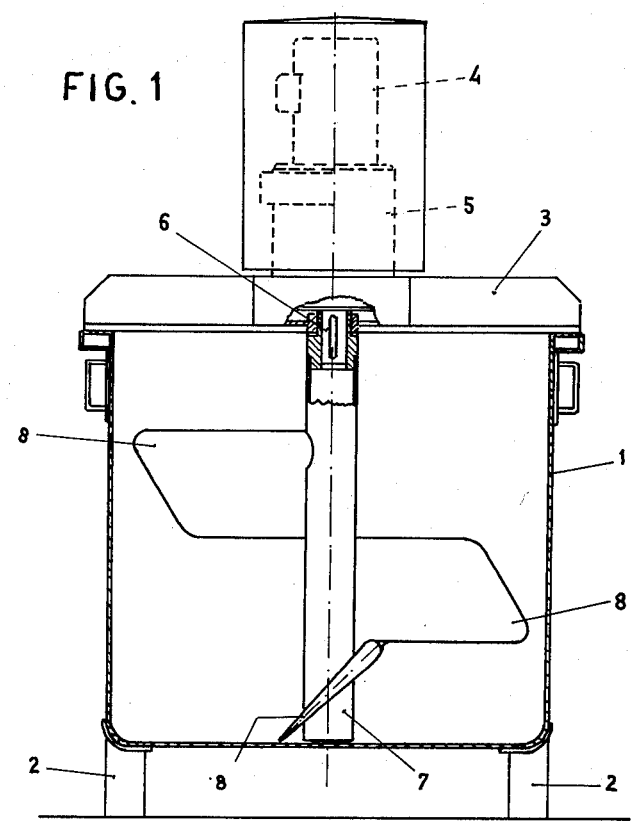
FIG. 1 is a vertical cross-section of a first embodiment of the container according to line I—I in FIG. 2.
Figure 2:
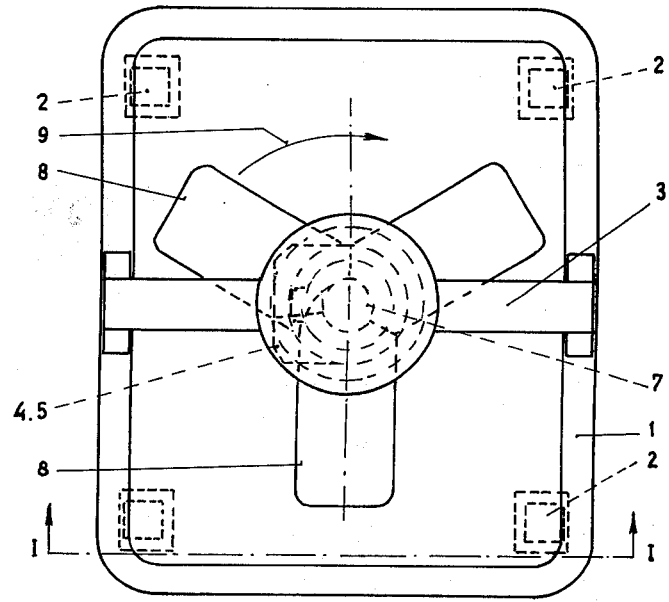
FIG. 2 is a plan view of the container shown in FIG. 1.

The stirring device shown in FIGS. 1 and 2 comprises a container 1 having vertical side walls and a bottom. In the embodiment shown, the horizontal cross-section of the container is rectangular with rounder corners but said cross-section may also have a different shape. The container 1 is provided with a number of suitable feet 2 with which it may rest on a base, e.g. a floor or table.

At their upper edges, the side walls of the container are provided with outwardly turned flanges. An elongated bridge piece 3, secured to the flanges of two opposite side walls, extends in the central parts of the upper side of the container. On top of this bridge piece 3 and in the middle thereof an electric motor 4 with a gear box 5 effecting a reduced velocity transmission is secured, such that the output shaft 6 of the gear box extends downwardly through the center of the bridge piece 3 into the container 1. The stirring shaft 7 is secured to the shaft 6, e.g. by means of a key and key way. The shaft 7 is mounted overhanging or cantilevered from the shaft 6 and extends down to nearly the bottom of the container 1 so that the assembly of bridge piece with drive unit 4, 5 and stirring shaft 7 can be removed by loosening the connection between the bridge piece and the opposite side walls of the container in order to be cleaned or replaced or repaired respectively.

The stirring shaft 7 carries a number of stirring blades 8, in the embodiment shown three blades, secured at mutual angular spacings of 120° to the shaft and in different levels so that each blade serves part of the contents of the container when the shaft 7 is rotated.

According to this embodiment the blades are not provided perpendicular to the shaft, as in the prior art, but inclined relative to the shaft 7 so that when the shaft is rotated in the direction of the arrow 9 in FIG. 2 the blades impart an upwardly directed vertical component of movement to the meat pieces stirred in the container.

If the angles of inclination of the blades are mutually equal as shown and, moreover, the blades have equal mutual angular spacings around the shaft, they are approximately contained in an imaginary helical surface around the shaft, whereby the matter stirred in the container moves substantially according to an upwardly directed helical movement.

In the embodiment according to FIG. 3 and 4 the blades each comprise a hollow body 10, which e.g. may be a welded structure, having flat upper and lower surfaces 11 and 12 respectively and rounded, preferably substantially half-cylindrical side walls 13. Said rounded portions impart the vertical components of movement to the meat pieces. The blade body is substantially diamond-shaped in plan view whereby the width in horizontal direction, circumferential relative to the shaft, first increases, starting from the shaft, up to a maximum 14, at about half the radial length of the body, and thereafter decreases again. It appears that with this embodiment of the stirring means the most favorable results are attained. The meat pieces are thereby at the same time exposed to radial forces so that the stirring is even more intensified. Nevertheless the rounded portions of the blade bodies ensure a mild engagement with the meat pieces so that they will be treated gently.

It should be understood that the intensity of treatment of the method disclosed in U.S. Pat. No. 3,775,134 and such method using the improved apparatus disclosed herein is much less intense than was thought possible by the art following the teachings of U.S. Pat. No. 3,076,713. In this better patent, it is clear that the meat is worked so hard that there is a substantial rise in the temperature thereof. To the contrary, there is no substantial rise in the temperature of the meat during stirring in either the process of U.S. Pat. No. 3,775,134 or such process using the improved apparatus described herein.

It will be obvious to those skilled in the art that various changes may be made without departing from the scope of the invention and the invention is not to be considered limited to what is shown in the drawing and described in the specification.

What is claimed is:

1. Apparatus for the treatment of meat products, comprising:
   a rectangular container with rounded edges;
   stirring means for subjecting all of the meat chunks retained in said container to a stirring movement, said stirring means comprising:
   a stirring shaft,
   a plurality of stirring blades affixed to said stirring shaft at angular spacings thereabout and at different levels thereon, each of said blades comprising a body which is symmetrical relative to its longitudinal axis and has flat upper and lower surfaces and rounded side walls, said rounded side walls causing horizontal and vertical components of movement of the meat chunks, the horizontal width of the blade perpendicular to its longitudinal axis first increasing, starting from the shaft up to a maximum substantially at half the radial blade length and thereafter decreasing again, and drive means connected to said stirring shaft for supplying sufficient power to said shaft to impart said horizontal and vertical components of movement to chunks of meat filling said container; and support means connected to said stirring means for supporting said stirring means such that said stirring shaft and said stirring blades are suspended within said container.

2. An apparatus in accordance with claim 1 wherein said stirring means is for subjecting meat chunks retained in said container to a stirring movement of an intensity insufficient to substantially raise the temperature of the meat but sufficient to cause the meat chunks to exude a tacky exudate, and said drive means is for supplying sufficient power to said shaft to cause said stirring blades to impart horizontal and vertical components of movement to chunks of meat filling said container at a velocity insufficient to substantially raise the temperature of the meat.

* * * * *

UNITED STATES PATENT OFFICE
CERTIFICATE OF CORRECTION

PATENT NO. : 3,934,860
DATED : January 27, 1976
INVENTOR(S) : Michels et al

It is certified that error appears in the above–identified patent and that said Letters Patent are hereby corrected as shown below:

Column 1, line 67, after "method" insert --using prior apparatus--

Signed and Sealed this thirteenth Day of April 1976

[SEAL]

Attest:

RUTH C. MASON
*Attesting Officer*

C. MARSHALL DANN
*Commissioner of Patents and Trademarks*